(12) United States Patent
Martysevich et al.

(10) Patent No.: US 11,098,561 B2
(45) Date of Patent: Aug. 24, 2021

(54) EVALUATING HYDRAULIC FRACTURING BREAKDOWN EFFECTIVENESS

(71) Applicant: Halliburton Energy Services, Inc., Houston, TX (US)

(72) Inventors: Vladimir Nikolayevich Martysevich, Spring, TX (US); Ronald Glen Dusterhoft, Katy, TX (US); Jianfu Ma, Pearland, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 175 days.

(21) Appl. No.: 16/448,993

(22) Filed: Jun. 21, 2019

(65) Prior Publication Data
US 2020/0399989 A1 Dec. 24, 2020

(51) Int. Cl.
*E21B 41/00* (2006.01)
*E21B 43/26* (2006.01)
*G01V 99/00* (2009.01)

(52) U.S. Cl.
CPC .......... *E21B 41/0092* (2013.01); *E21B 43/26* (2013.01); *G01V 99/005* (2013.01)

(58) Field of Classification Search
CPC .......... E21B 43/17; E21B 43/25; E21B 43/26; E21B 43/2605; E21B 43/2607; E21B 43/263; E21B 43/267; E21B 43/27
See application file for complete search history.

(56) References Cited

U.S. PATENT DOCUMENTS

| 5,050,674 A | * | 9/1991 | Soliman | ............... E21B 49/008 166/250.1 |
| 5,183,109 A | * | 2/1993 | Poulsen | .................. E21B 43/26 166/250.1 |
| 6,705,398 B2 | | 3/2004 | Weng | |

(Continued)

FOREIGN PATENT DOCUMENTS

| RU | 2270335 C2 | 2/2006 |
| WO | 2018132106 A1 | 7/2018 |

OTHER PUBLICATIONS

Hou, et al.; "A new method for evaluating the injection effect of chemical flooding"; Petroleum Science, vol. 13, Issue 3; DOI 10.1007/s12182-016-0091-8; CrossMark; Springer; Springerlink.com; Apr. 8, 2016; 11 pgs.

(Continued)

*Primary Examiner* — Blake E Michener
(74) *Attorney, Agent, or Firm* — John W. Wustenberg; Parker Justiss, P.C.

(57) ABSTRACT

The disclosure improves the analysis of the hydraulic fracturing (HF) break down process of a well system. The analysis can use as inputs collected HF data such as the HF fluid pressure, HF fluid flow rate, and HF fluid composition over one or more time intervals. In some aspects, the perforation parameters and stratigraphic well placement can also be used as inputs. The analysis can also use as inputs the HF model inputs that were used in collecting the HF data. The analysis can determine an effectiveness parameter of the received inputs. HF model inputs can be selected that would best fit a HF job plan goal for the current well system. In some aspects, the HF model inputs can be communicated to a well system controller of the current well system to further direct HF job plan operations.

17 Claims, 8 Drawing Sheets

(56) References Cited

U.S. PATENT DOCUMENTS

| | | |
|---|---|---|
| 8,838,427 B2 | 9/2014 | Segal et al. |
| 9,350,627 B2 | 5/2016 | Cremonesi et al. |
| 9,465,123 B2 | 10/2016 | Lin |
| 9,982,523 B2 | 5/2018 | Ciezobka et al. |
| 2003/0050758 A1* | 3/2003 | Soliman ............... E21B 49/008 702/6 |
| 2005/0056418 A1* | 3/2005 | Nguyen ................ E21B 43/26 166/250.1 |
| 2006/0015310 A1* | 1/2006 | Husen .................. E21B 43/26 703/10 |
| 2008/0162099 A1* | 7/2008 | Vega Velasquez ...... E21B 43/26 703/10 |
| 2008/0209997 A1* | 9/2008 | Bailey ................... E21B 43/26 73/152.02 |
| 2009/0182694 A1* | 7/2009 | Boulatsel .............. E21B 43/26 706/19 |
| 2010/0250216 A1 | 9/2010 | Narr et al. |
| 2011/0125471 A1* | 5/2011 | Craig ..................... G01V 1/42 703/6 |
| 2012/0179444 A1* | 7/2012 | Ganguly ................ E21B 43/26 703/10 |
| 2012/0241152 A1* | 9/2012 | Brannon ............... E21B 49/008 166/280.2 |
| 2013/0140031 A1* | 6/2013 | Cohen .................. E21B 43/26 166/308.1 |
| 2014/0058686 A1 | 2/2014 | Anderson et al. |
| 2014/0067353 A1 | 3/2014 | Shelley et al. |
| 2016/0042272 A1* | 2/2016 | Mohaghegh ........... E21B 43/30 706/19 |
| 2016/0178798 A1* | 6/2016 | Holland ............... G01V 99/005 703/2 |
| 2016/0356127 A1* | 12/2016 | Dykstra ................ E21B 33/14 |
| 2017/0002630 A1 | 1/2017 | Priezzhev et al. |
| 2017/0045636 A1* | 2/2017 | Ma ......................... G01V 1/40 |
| 2017/0145793 A1* | 5/2017 | Ouenes .................. E21B 43/26 |
| 2017/0226838 A1 | 8/2017 | Ciezobka et al. |
| 2018/0128091 A1 | 5/2018 | Harper |
| 2018/0355707 A1* | 12/2018 | Rodriguez Herrera .. G01V 1/42 |
| 2018/0364381 A1* | 12/2018 | Raterman ............. G01V 1/288 |
| 2019/0128111 A1* | 5/2019 | Pandey .................. H03M 7/30 |
| 2019/0330975 A1* | 10/2019 | Martysevich ........... E21B 47/10 |

OTHER PUBLICATIONS

Martsevich, et al.; "Interpretation of Pumping Pressure Behavior and Diagnostic for Well Perforation Efficiency During Pumping Operations"; PCT/US2018/064300; Halliburton Energy Services, Inc.; Dec. 6, 2018.

* cited by examiner

EVALUATING HYDRAULIC FRACTURING BREAKDOWN EFFECTIVENESS

TECHNICAL FIELD

This application is directed, in general, to developing a hydraulic fracturing job plan and, more specifically, to a developing a hydraulic fracturing job plan for the breakdown process.

BACKGROUND

Hydraulic fracturing (HF) is a technique that can be used in the hydrocarbon production industry, e.g., oil and gas production. Typically, HF fluid is pumped into a wellbore under a sufficient pressure to cause a subterranean formation to fracture, thereby allowing the trapped hydrocarbons to be extracted from the wellbore. A HF job plan, a plan on how to develop a well system area, can specify how the HF fluid is pumped into a wellbore, under what fluid pressure, at what flow rate, using what fluid composition, and other factors related to the development of the well system. The characteristics of the HF fluid pumping operations can affect how the well system area fractures, how quickly the fractures develop, and the cost of the HF operations. For example, ramping up the HF fluid pressure to a maximum pressure too quickly can result in an excess wear and tear on the pumping equipment while not returning that maintenance cost in terms of the development of the fractures of the subterranean formation.

Determining how the HF fluid is pumped into the wellbore can be based on various factors, such as experiences from previous wellbores with a similar set of subterranean formation characteristics, and the bias of well system operators overseeing the HF job plan execution. Evaluating past and current HF operations would be beneficial for determining how to proceed with HF fluid pumping operations for a well system area.

SUMMARY

In one aspect, a method to determine a hydraulic fracturing (HF) job plan for a current well system is disclosed. In one embodiment, the method includes: (1) receiving HF data and corresponding HF model inputs for one or more previous well systems, wherein the previous well systems contain a similar subterranean formation as the current well system, and wherein the HF model inputs include, over a time interval, at least one of a HF fluid pressure, a HF fluid flow rate, and a HF fluid composition, (2) calculating a fitted function utilizing an analysis of a HF breakdown within each of the previous well systems utilizing the HF data, (3) computing an effectiveness parameter for each of the fitted functions and the HF model inputs, (4) selecting HF model inputs utilizing the effectiveness parameter, and (5) modifying the HF job plan utilizing the HF model inputs.

In a second aspect, a computer program product having a series of operating instructions stored on a non-transitory computer-readable medium that directs a data processing apparatus when executed thereby to determine a HF job plan for a current well system is disclosed. In one embodiment, the computer program product includes: (1) receiving HF data and corresponding HF model inputs for one or more previous well systems, wherein the previous well systems contain a similar subterranean formation as the current well system, and wherein the HF model inputs include, over a time interval, at least one of a HF fluid pressure, a HF fluid flow rate, and a HF fluid composition, (2) calculating a fitted function utilizing an analysis of a HF breakdown within each of the previous well systems utilizing the HF data, (3) computing an effectiveness parameter for each of the fitted functions and the HF model inputs, (4) selecting HF model inputs to be utilized by the HF job plan, utilizing the effectiveness parameter.

In another aspect, a system to provide HF model inputs into a HF job plan is disclosed. In one embodiment, the system includes: (1) a receiver, operable to receive one or more sets of HF data and corresponding HF model inputs for one or more previous well systems, and (2) a HF breakdown analyzer, operable to analyze each set of HF data to calculate a fitted function, to compute an effectiveness parameter utilizing the fitted function and the corresponding HF model inputs, and to select the set of HF data that has the effectiveness parameter closest to a goal of the HF job plan.

BRIEF DESCRIPTION

Reference is now made to the following descriptions taken in conjunction with the accompanying drawings, in which.

DETAILED DESCRIPTION

In the hydrocarbon production industry, such as oil and gas production, well systems can be developed, e.g., brought to a production state, using various wellbore drilling techniques. One technique for developing a well system is hydraulic fracturing (HF) (see FIG. 1). The HF development process typically comprises of pumping a HF fluid into a wellbore location. The HF fluid is pumped through a well tubulars into a perforated well interval, which is located within the wellbore. Each perforated interval can have one or more perforations allowing the HF fluid to escape the wellbore and enter the subterranean formation. The perforations can be of various sizes, be spaced at the same or varying distances from one another, and can have an arc around the well tubular, for example, at zero degrees or zero to 100 degrees. Another variation to the perforations can be perforation phasing, e.g., radial distribution of successive perforating charges around the well tubular central axis.

The HF fluid pressure and volume can force fractures to open and increase in size within the subterranean formation—referred to as fracturing or breaking down the formation. The HF fluid pressure and the HF fluid rate can be adjusted to change how and when fractures open up within the subterranean formation. In addition, the HF fluid composition, i.e., slurry, can be adjusted, such as when different proppants are utilized and as various fluid additives are included in the fluid composition.

The process of breaking down the formation can be implemented using a HF job plan, which can specify the ramp up of the HF fluid pressure, the ramp up of the HF fluid flow rate, and the HF fluid composition, among other HF processes and factors. The selection of the parameters for each of these factors can impact the cost of breaking down the formation. For example, running a HF fluid pump at a high pressure can break down a formation quickly, at a cost of additional wear and tear on the pumps and increasing the maintenance costs. The return, in terms of the subterranean formation breaking down, on the increased costs may not be beneficial for the overall costs of developing the well system. A lower pump pressure may result in a more cost effective well system development, for example, determining a point of diminishing returns when increasing the pump pressure.

In some wellbores, the breakdown process can lead to an uneven flow distribution of the HF fluid through each of the perforations of the perforated well interval, especially for multi-cluster perforation designs (see FIGS. 2A-2D). It can be beneficial to be able to measure the effectiveness of varying perforation parameters on the breakdown process in the subterranean formation. Well system development costs may be lowered by selecting a set of perforation parameters that may be more effective than a different set of parameters. In addition, the initial breakdown process can be difficult to modify once the subterranean formation has been fractured.

Interpreting what is occurring within the subterranean formation during the break down process can be difficult. For example, the well system operations team can implement varying HF fluid pump pressures with varying ramp up rates. They can also modify the HF job plan while the current HF job stage, i.e., treatment, is in progress, e.g., on the fly changes. These variations may not provide consistency between HF job stages which can make measurements taken more difficult to interpret. In addition, the well system operations team can maximize the HF fluid pressure as quickly as possible to achieve a desired HF fluid flow rate. Implementing a HF job stage using a high or maximum pump pressure can increase the operational costs of the well system by increasing the maintenance costs of the HF fluid pump equipment and can reduce the life of the pump fluid end.

This disclosure describes a process to quantify a fracture breakdown operation. The quantified results can be applied to demonstrate the effectiveness of various HF techniques, such as acid breakdown, gel pills, diversion techniques, and other HF techniques and processes. The described processes can be performed separate from an active well system or they can be run in real-time or near real-time to provide responsive feedback to the well system's well site controller on how to adjust the HF fluid pumps and HF fluid composition, as well as adjustments to other parameters.

Once quantified, the process can determine an effectiveness of varying HF fluid pumping pressures, flow rates, and compositions. In some aspects, the effectiveness can also include perforation locations and stratigraphic well placement. The effectiveness can be represented by an effectiveness parameter. By matching one or more previous well system HF model inputs to a current well system, a HF model input can be selected for the HF job plan for the current well system utilizing the effectiveness parameter. HF model inputs can include one or more of a HF fluid pressure, a HF fluid flow rate (e.g., volumetric or mass flow rate), a HF fluid composition, perforation parameters, and other HF job plan inputs. The effectiveness parameter can represent a goal for the current well system. Goals can be one or more of minimizing costs, minimizing time, minimizing wear and tear on the HF fluid pump equipment, maximizing flow area during the fracturing operation, maximizing production over a time interval, and other goals, such as maximizing perforation cluster efficiency.

The process to quantity the fracture breakdown operation can be implemented by analyzing the HF data received from one or more of the current or previous well systems, for example, a previous HF treatment of the current well system can be utilized as the input HF data. In some aspects, the previous well system can be a separate well system that can be located proximate to or a distance from the current well system, where the separate well system contains a similar subterranean formation as the current well system. Similar subterranean formations mean any subterranean formation that would behave similarly under the same hydraulic fracturing conditions, as compared to the current well system. This can include subterranean formations having a same or similar physical and mineralogical makeup or having a varying physical and mineralogical makeup while interacting with the hydraulic fracturing process in a similar way.

Each set of received HF data can be analyzed using the current well system parameters, such as the type of rock and subterranean formation features, natural fracture patterns, and other well system parameters. The analyzation can determine a HF fluid flow rate ramp up corresponding to a bottom hole HF fluid pressure. A fitted function can be calculated using constraints, such as the y-axis intercept being at a value of a horizontal minimum stress and the fit is at a low limit of the analyzed HF data. The fitted function can represent a line, curve, or another geometric figure. The computations can be represented graphically (see FIG. 3).

After the fitted function has been calculated, an effectiveness parameter can be derived. The area under the geometric shape, represented graphically by the fitted function and the maximum plotted HF data point for each point of the fitted function, can be computed. The computed area and the corresponding HF model inputs can be utilized to compute the effectiveness parameter. In cases where the fitted function is a linear function, i.e., a straight line, then the effectiveness parameter can be computed using the slope of the fitted function and the computed area.

The effectiveness parameter can be utilized to select the HF model inputs that best meet the goals of the HF job plan. The HF model inputs can be provided to well site controllers of a current well system. The well site controllers can then issue commands and instructions to the HF fluid pumps of the current well system to execute the HF treatment stage. This process can be operated manually, semi-automatically, or autonomously. By optimizing the HF treatment for the current well system, costs can be lowered. For example, a well system that uses 18 pumps and additional 2 reserved as backup pumps can eliminate the 2 backup pumps. The cost of the pumps, the maintenance costs, the transportation costs, and other costs, such as fuel and personnel, can be saved using the processes described herein. In addition, the optimizing of the HF breakdown can result in additional operational savings.

Figure 1:
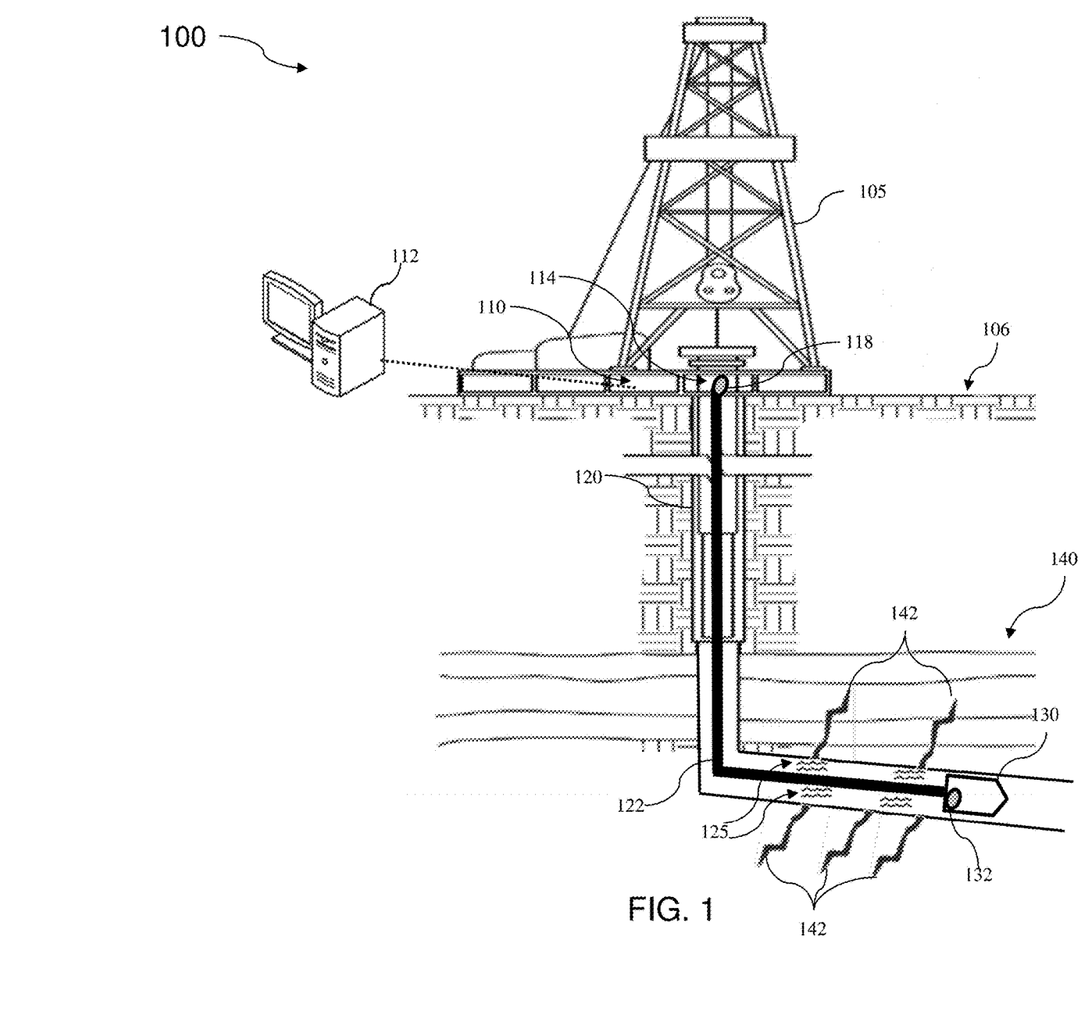
FIG. 1 is an illustration of a diagram of an example hydraulic fracturing (HF) well system.

Turning now to the figures, FIG. 1 is an illustration of a HF well system 100. HF well system 100 can be a well system where HF operations are occurring through the implementation of a HF job plan. HF well system 100 demonstrates a nearly horizontal wellbore undergoing fracturing operations. Although FIG. 1 depicts a specific wellbore configuration, those skilled in the art will understand that the disclosure is equally well suited for use in wellbores having other orientations including vertical wellbores, horizontal wellbores, slanted wellbores, multilateral wellbores, and other wellbore types. FIG. 1 depicts an onshore operation. Those skilled in the art will understand that the disclosure is equally well suited for use in offshore and other operations.

HF well system 100 includes a surface well equipment 105 located at a surface 106, a well site control equipment 110, and a HF pump system 114. In some aspects, well site control equipment 110 is communicatively connected to a separate computing system 112, for example, a separate server, data center, cloud service, tablet, laptop, smartphone, or other types of computing systems. Computing system 112 can be located proximate to the well site control equipment 110 or located a distance from the well site control equipment 110. In some aspects, HF pump system 114 can include a fluid gauge 118 located at the wellhead assembly.

Extending below the surface 106 from the surface well equipment 105 is a wellbore 120. Wellbore 120 can have zero or more cased sections and a bottom section that is uncased. Inserted into the wellbore 120 is a well tubulars 122. Optionally, at the end of the well tubulars 122 is a bottom hole assembly (BHA) 130. In some aspects, BHA 130 can include a fluid gauge 132. In HF well system 100, well tubulars 122 is releasing HF fluid 125 into the formation 140 at a determined HF flow rate with HF fluid pressure measured as a response to the HF operation. The HF fluid 125 is being absorbed by several active fractures 142. The HF fluid 125 pressure can be measured by the fluid gauge 132 of the BHA 130, by the fluid gauge 118 of the HF pump system 114, or by other applicable sensors located within wellbore 120 or outside of the wellbore 120. The HF fluid pressure values determined by fluid gauge 118 or fluid gauge 132 can be communicated to well site control equipment 110. In addition, the HF fluid rate absorption values, and the HF fluid composition, can be communicated to well site control equipment 110 from HF pump system 114. Collectively, this data can be the HF data used as inputs into the disclosed process.

Well site control equipment 110 can include a HF fluid monitor system capable of receiving the HF data, such as the HF fluid pressure values, the HF fluid rate absorption values, and the HF fluid composition. In addition, the well site control equipment 110 can include a HF breakdown analyzer. In other aspects, the HF fluid monitor system or the HF breakdown analyzer can be located with the computing system 112, in various combinations. The HF fluid monitor system can provide the received HF data and the HF model inputs to the HF breakdown analyzer to compute the effectiveness parameter for the breakdown process. In other aspects, the HF breakdown analyzer can receive one or more sets of HF data and their corresponding HF model inputs from other systems, for example, a data source or another well system. The HF breakdown analyzer can provide a recommendation on the HF model inputs to use for a HF job stage for the current well system.

The HF fluid monitor system can be a separate system, included with the well site control equipment 110, or the computing system 112. The HF breakdown analyzer can be included with the HF fluid monitor system, the well site control equipment 110, or the computing system 112. The HF breakdown analyzer can be a separate computing system, be part of those components, or be a program or application executing on those components. The HF breakdown analyzer can be a dedicated processor, e.g., a central processing unit, a graphics processing unit, a single instruction multiple data unit, or other processor type, as well as a virtual processor or set of instructions executing on a processor or computing system.

In an alternative aspect, computing system 112 can be located a distance from the HF well system 100, such as in a data center, server, or other system, and computing system 112 can be disconnected from the HF well system 100. In this aspect, computing system 112 can receive one or more sets of HF data and the corresponding HF model inputs from a data source, where the sets of HF data were previously gathered by HF well system 100 or other HF well systems. The HF breakdown analyzer is part of computing system 112 and can produce a recommendation on the implementation of a HF job stage, such as the HF fluid pressure ramp up, the HF fluid flow rate, the HF fluid composition, and other parameters.

Figure 2A:
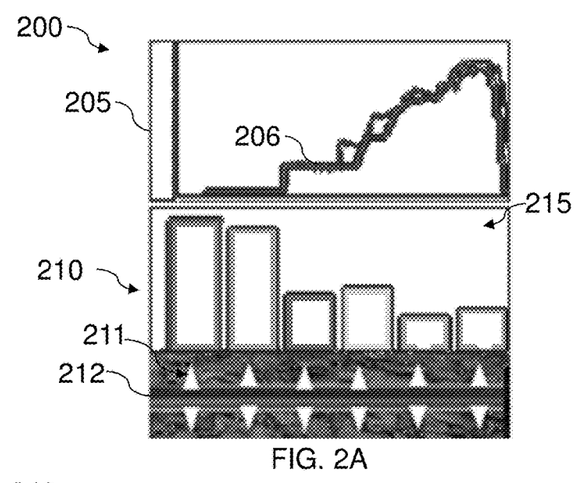
FIG. 2A is an illustration of a chart of an example ineffective HF breakdown process.

FIG. 2A is an illustration of a chart of an example ineffective HF breakdown process 200. HF breakdown process 200 includes two sections. The top section is a line plot 205 that demonstrates an ineffective breakdown. The x-axis is the HF fluid flow rate and the y-axis is the HF fluid pressure. The data is plotted as line 206, which demonstrates that that the HF fluid pressure is increasing along with the increase in HF fluid flow rate. The bottom section is a bar chart 210 that demonstrates the HF fluid rate at a series of perforations 211 within a perforated well interval 212. The HF fluid flow rate across the perforations are not indicating an approximate even absorption rate by the fractures, as shown by the uneven length bars 215. The uneven absorption rate is one indicator that the breakdown process may not be as optimized as possible within the well system.

Figure 2B:
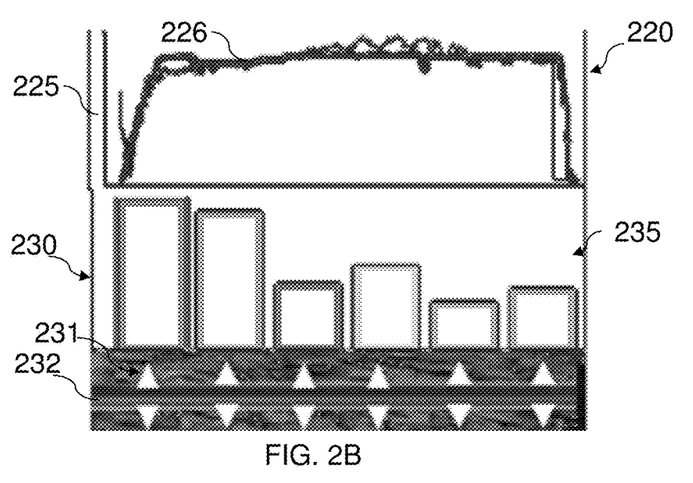
FIG. 2B is an illustration of a chart of an example of an uneven flow distribution.

FIG. 2B is an illustration of a chart of an example uneven flow distribution 220. Flow distribution 200 includes two sections. The top section is a line plot 225 that demonstrates an uneven distribution of HF fluid flow rates. The x-axis is the HF fluid flow rate and the y-axis is the HF fluid pressure. The data is plotted as line 226 and shows a relatively constant injection rate of HF fluid. The bottom section is a bar chart 230 that demonstrates the HF fluid rate at a series of perforations 231 within a perforated well interval 232. The HF fluid flow rate across the perforations are not indicating an approximate even absorption rate of HF fluid by the fractures, meaning that even when the injection rate is near constant, the rate at which the HF fluid enters the perforation clusters varies significantly, as shown by uneven length bars 235. The uneven distribution rate is one indicator that the breakdown process may not be as optimized as possible within the well system.

Figure 2C:
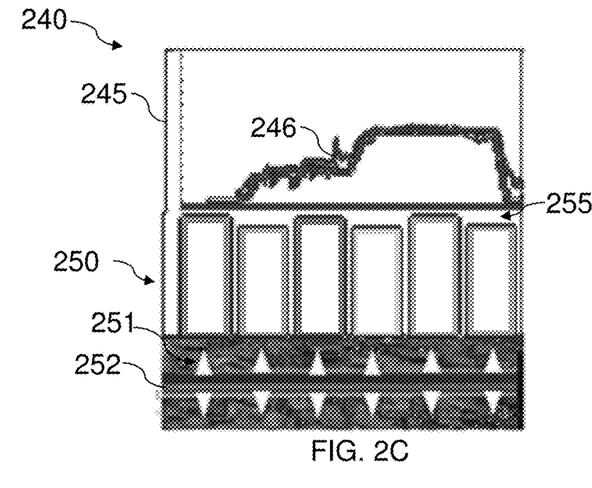
FIG. 2C is an illustration of a chart of an example effective HF breakdown process.

FIG. 2C is an illustration of a chart of an example effective HF breakdown process 240. HF breakdown process 240 includes two sections. The top section is a line plot 245 that demonstrates an effective breakdown. The x-axis is the HF fluid flow rate and the y-axis is the HF fluid pressure. The data is plotted as line 246, which demonstrates that that the HF fluid pressure is increasing along with the increase in HF fluid flow rate and then the HF pressure levels off as the HF fluid flow rate continues to increase. The bottom section is a bar chart 250 that demonstrates the HF fluid rate at a series of perforations 251 within a perforated well interval 252. The HF fluid flow rate across the perforations indicate an approximate even absorption rate by the fractures, as shown by the relatively similar length bars 255. The absorption rate can vary between the perforations 251, as long as the absorption rates are close in value, such as within a system provided flow rate differential value. The relatively even absorption rate is one indicator that the breakdown process may be optimized for the well system.

Figure 2D:
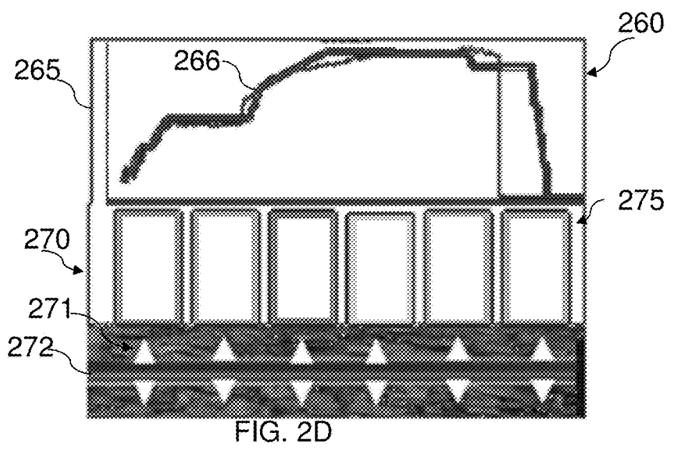
FIG. 2D is an illustration of a chart of an example of an even flow distribution.

FIG. 2D is an illustration of a chart of an example of an even flow distribution 260. Flow distribution 260 includes two sections. The top section is a line plot 265 that demonstrates an even distribution of HF fluid flow rates. The x-axis is the HF fluid flow rate and the y-axis is the HF fluid pressure. The data is plotted as line 266, showing a varying injection rate of HF fluid. The bottom section is a bar chart 270 that demonstrates the HF fluid rate at a series of perforations 271 within a perforated well interval 272. The HF fluid flow rate across the perforations indicate an approximate even absorption rate of HF fluid by the fractures, as shown by the relatively similar length bars 275. The distribution rate can vary between the perforations 271, as long as the absorption rates are close in value, such as within a system provided distribution differential value. The even distribution rate is one indicator that the breakdown process may be optimized for the well system.

Figure 3:
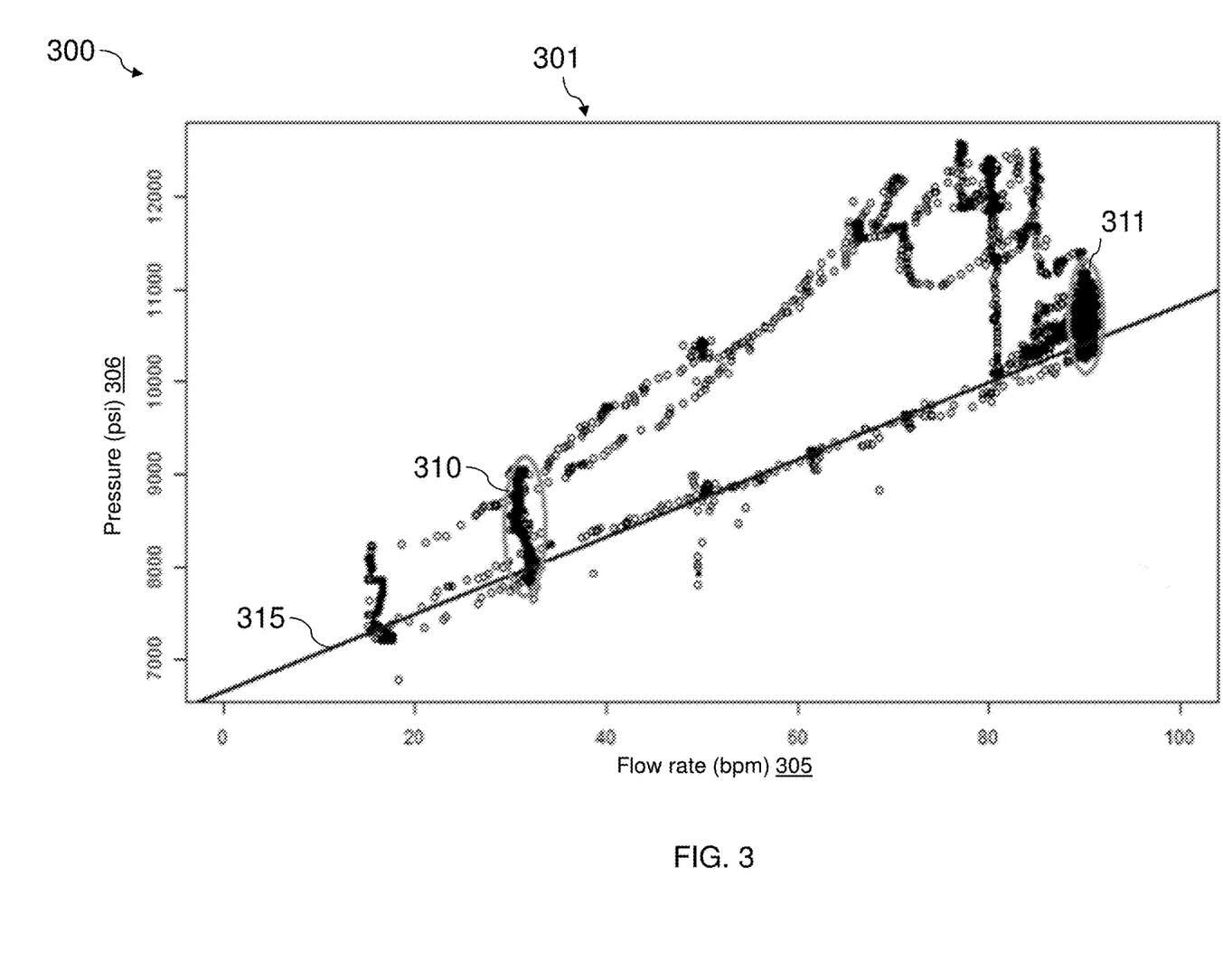
FIG. 3 is an illustration of a chart of an example HF data line plot with a fitted line.

FIG. 3 is an illustration of a chart of an example HF data line plot 300 with a fitted line. A HF data set, related to HF model inputs, such as HF fluid treating pressure and HF fluid pumping flow rate, can be collected during HF stimulations, e.g., treatments. HF data line plot 300 shows an example set of HF data. The curve of the HF fluid treating pressure and the HF fluid pumping flow rate can be used to infer information of an in-situ reservoir formation. HF data line plot 300 has an x-axis 305 showing the HF fluid flow rate in barrels per minute (bmp) and a y-axis 306 showing the HF fluid pressure in pounds per square inch (psi). The set of HF data is plotted in plot area 301.

The set of HF data can exhibit distinct groups with high density, which are highlighted by oval 310 and oval 311. A density-based clustering method, such as a density-based spatial clustering applications with noise (DBSCAN) can be applied to the HF data. The DBSCAN can statistically group similarly close data (in terms of plot distance) together as a data cluster. These data clusters can be analyzed separately. These clusters represent data captured during the bulk of the fracturing treatment where the flow rate, in most situations, is held nearly constant. The trends in this data can be utilized for fracturing pressure diagnostics to help understand fracture growth behaviors. The analysis can be focused on the early and late job times where the rate is being changed during the break down process, or the shutdown process, near the end of the treatment.

Fitted line 315 has been calculated utilizing a fitted function derived from the set of HF data. Fitted line 315 is an approximate representation of the minimum pressure values at different injection rates for the set of HF data. The fitted function for fitted line 315 can utilize an analyzation algorithm. The analyzation algorithm can analyze the relationship between the HF fluid pressure and the HF fluid flow rate to determine the minimum HF fluid treatment pressure. For example, a Hough transform can use a voting process where each HF data point votes for the possible lines through it, and each line votes for the possible segments connecting any two points on the line. For the HF data, any two points, $(x_1, y_1)$ and $(x_2, y_2)$, where x represents the HF fluid flow rate and y represents the HF fluid pressure, a line segment can be determined using the parameters as shown in Formula 1.

Example line segment calculations    Formula 1

$$\text{slope} = \frac{y_2 - y_1}{x_2 - x_1}, \text{intercept} = \frac{x_2 y_1 - x_1 y_2}{x_2 - x_1}$$

Figure 4A:
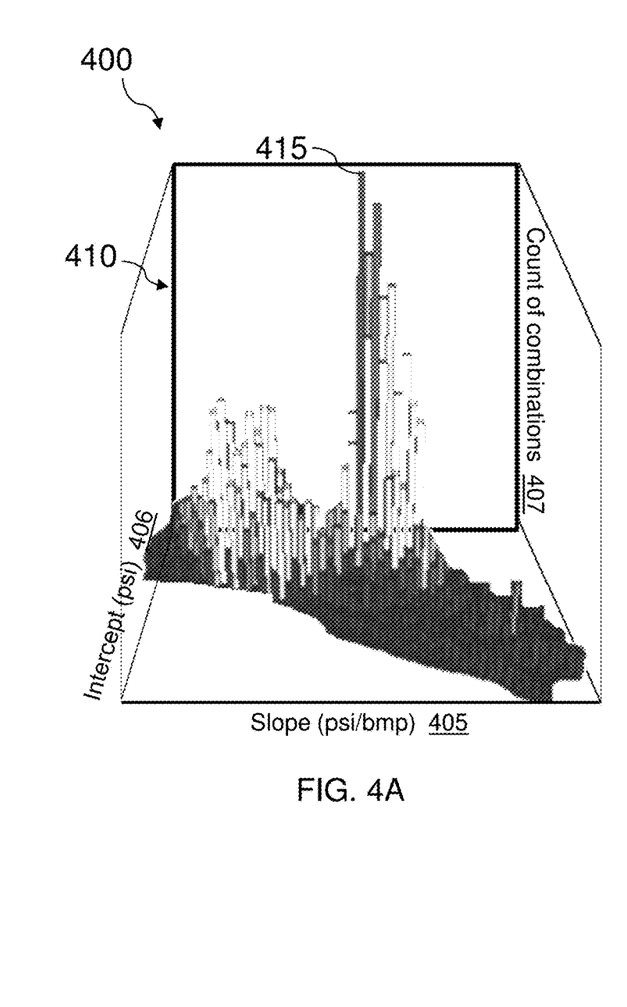
FIG. 4A is an illustration of a chart of an example two-dimensional histogram of the HF data shown in FIG. 3.

FIG. 4A is an illustration of a chart of an example two-dimensional histogram 400 of the set of HF data as used in FIG. 3. After calculating the slopes and intercepts for the possible combinations of paired points, such as using Formula 1, the results can be represented by a probability histogram of the slopes and intercepts, as demonstrated in histogram 400. The number of slopes and intercepts is typically $N(N-1)/2$, where N is the number of points. Histogram 400 has a plot area 410, where the height of the bars represent the voting results from the analyzation algorithm described in FIG. 3. The x-axis 405 represents the slope of each analyzed line. The y-axis 406 represents the intercept of each analyzed line. The z-axis 407 represents the count of all combinations of paired points. Bar 415 indicates the tallest bar, which represents that this line should be designated as the fitted line for the HF data set.

Certain data characteristics can be derived from analyzing the histogram of the slope/intercept data. The data characteristics can be the peak locations, the global maximum, and the local maximum. At these data characteristic points, the z-axis 407 indicates the number of segments that are part of the fitted line, while inferring the remaining points on the line. For example, using the set of HF data as shown in FIG. 3, the maximum value of the histogram 400 of 17,169 can indicate that there are 17,169 line segments at an x-axis 405 slope of 45.85 and a y-axis 406 intercept of 6,840. There can exist one or more local maxima exhibited by the histogram 400. Each local maximum can represent a line with a certain slope and intercept. The corresponding line to the slope-intercept can match a subset of the HF fluid pressure and HF fluid flow rate data. The local maxima line, from the set of corresponding lines, coinciding with the fitted line can be identified. The intercept of the local maxima line can be utilized to estimate the minimum HF fluid treatment pressure, the fracture closure pressure, and minimum horizontal principal stress. The algorithm searches the local maxima and determines the line coinciding with the fitted line 315 in FIG. 3. The algorithm can begin at the global maxima and iterate through the local maxima.

Figure 4B:
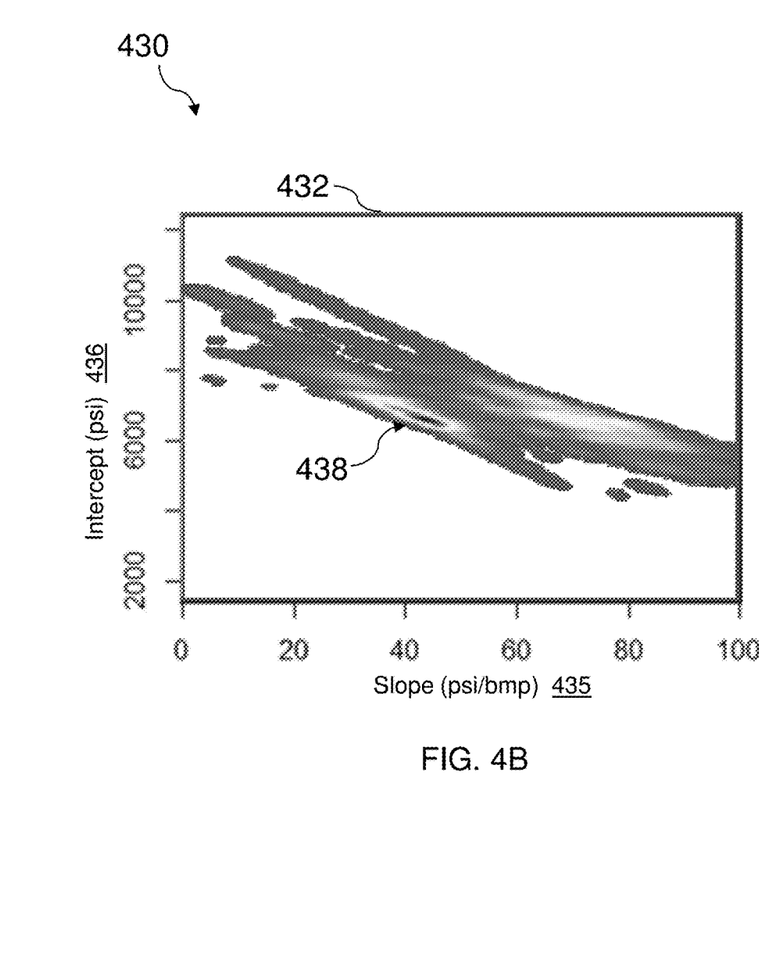
FIG. 4B is an illustration of a chart of an example two-dimensional histogram projection of the data shown in FIG. 4A.

FIG. 4B is an illustration of a chart of an example two-dimensional histogram projection 430 of the histogram data shown in FIG. 4A. The x-axis 435 is the slope in psi/bmp units and the y-axis 436 is the intercept in psi units. The projection area 432 shows the histogram 400 data cast as a two-dimensional intensity map. Area 438 on the projection area 432 represents the set of tall bars, such as bar 415.

Figure 5A:
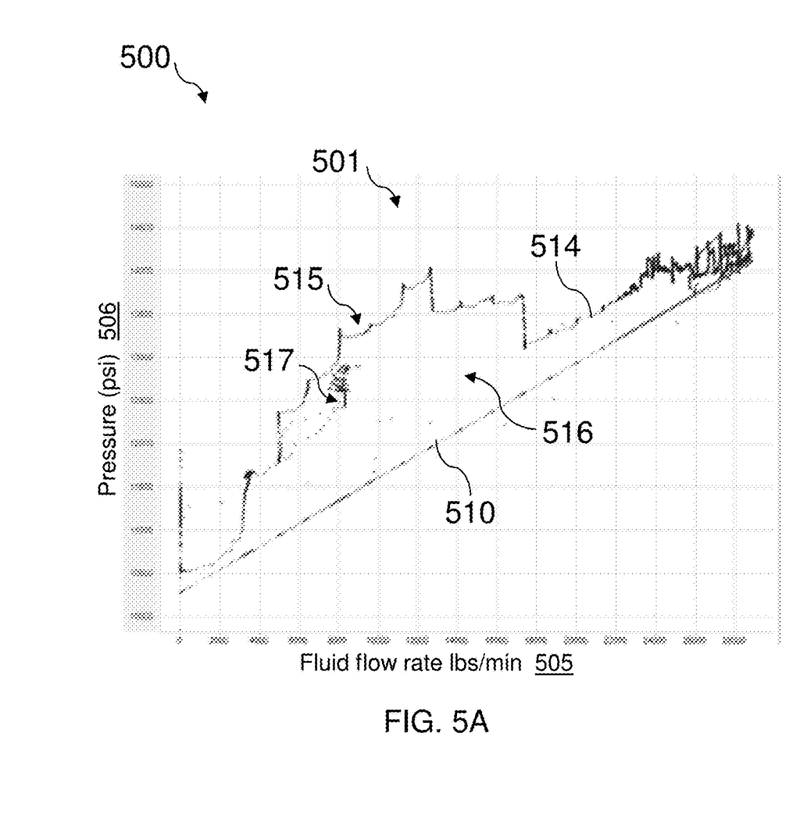
FIG. 5A is an illustration of a chart of an example efficient HF breakdown plotted with a minimum fit line.

FIG. 5A is an illustration of a chart of an example efficient HF breakdown 500 plotted with a minimum fit line. HF breakdown 500 has an x-axis 505 for the HF fluid flow rate in pounds per minute (lbs/min) and a y-axis 506 for the HF fluid pressure in psi. Chart area 501 has a set of HF data plotted as data points 514 and a calculated fitted line 510.

Fitted line 510 and the top curve of data points, represented by curve line 515, form an area 516 that can be computed. The area 516 is $8e^6$ psi$^2$ for HF breakdown 500. This area 516 can be utilized, along with the HF model inputs, to determine the effectiveness parameter. There is additional data points 517 which do not follow the curve line 515. An effective breakdown can occur when the additional data points 517 is a relative minimum compared to the total data points, such as data points 514.

Figure 5B:
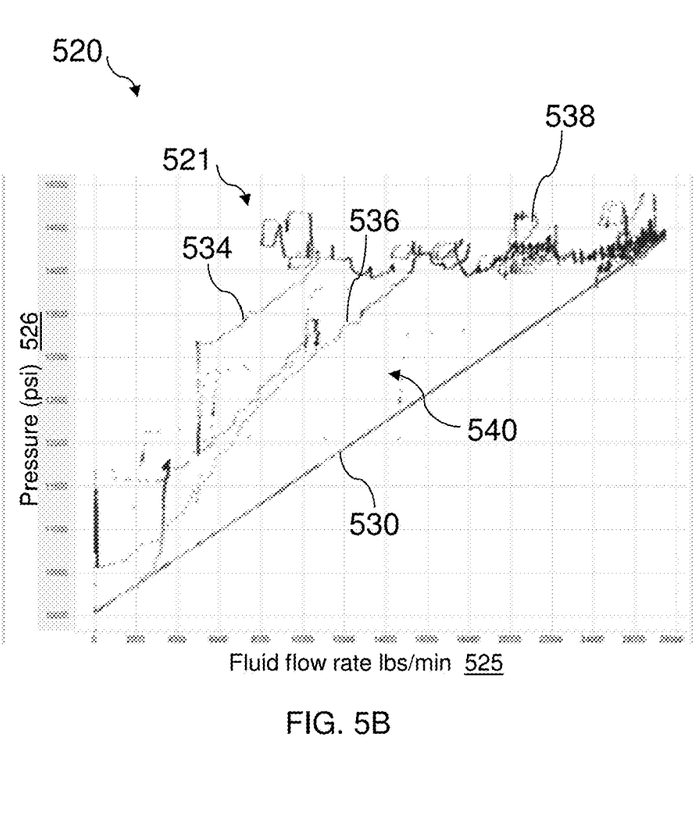
FIG. 5B is an illustration of a chart of an example inefficient HF breakdown plotted with a minimum fit line.

FIG. 5B is an illustration of a chart of an example inefficient HF breakdown 520 plotted with a minimum fit line. HF breakdown 520 has an x-axis 525 for the HF fluid flow rate in lbs/min and a y-axis 526 for the HF fluid pressure in psi. Chart area 521 includes a set of HF data points from an ineffective breakdown and a fitted line 530, where the HF data is different than used in HF breakdown 500. Data points 534 and data points 536 demonstrate two distinct top line curves for this set of HF data. In addition, the data points 538 appear to form a looping curve. These elements demonstrate an inefficient breakdown.

The computed area 540 for the data points is approximately $19.7e^6$ psi$^2$. When compared to the HF breakdown 500, HF breakdown 520 has over double the area under the curve. This indicates that HF breakdown 500 is more efficient than HF breakdown 520. A smaller area indicates a more efficient breakdown process, e.g., the data values tend to cluster around a similar slope and intercept line. The HF model inputs corresponding to the HF data used in HF breakdown 500 can then be recommended as the HF model inputs to utilize in the current well system. In some aspects, this comparison can include additional characteristics and elements, such as perforation strategies and stratigraphic well placement. In this scenario, multiple variables can be used to evaluate the HF breakdown processes.

FIGS. 2A, 2B, 2C, 2D, 3, 4A, 4B, 5A, and 5B demonstrate a visual representation of the HF data and how the data can be analyzed. In other aspects, the HF data can be analyzed by a computing system that does not include a visual component where the results and recommendations can be provided as the result from the processes described herein. In this aspect, while not used for the computations, the visual component can be generated for a user.

Figure 6:
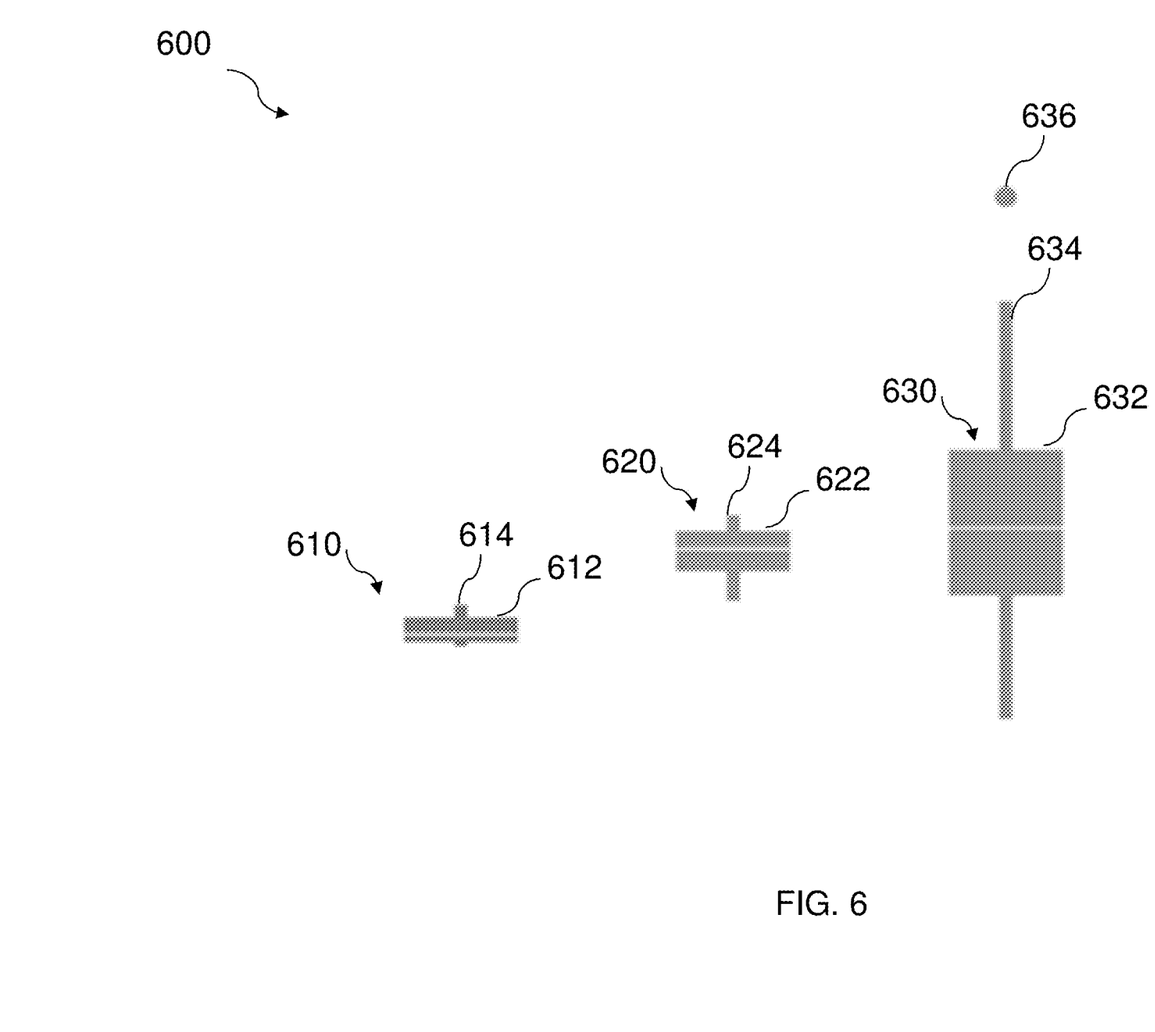
FIG. 6 is an illustration of a diagram of an example comparison between various HF breakdown processes.

FIG. 6 is an illustration of a diagram of an example comparison 600 between various HF breakdown processes. Comparison 600 includes three different sets of collected HF data, set 1 610, set 2 620, and set 3 630. Set 1 610 represents an HF data set that was collected using a HF breakdown process guided by a determined effectiveness parameter using the processes as described herein. Set 1 610 demonstrates a computed area 612 (between the plotted data curve and the fitted line) and a distribution 614 (flow rate distribution across perforations).

Set 2 620 represents an HF data set that was collected using a HF breakdown process guided by a determined effectiveness parameter using the processes as described herein, using a different HF data set than used for set 1 610. Set 2 620 demonstrates a computed area 622 (between the plotted data curve and the fitted line) and a distribution 624 (flow rate distribution across perforations). Set 3 630 represents an HF data set that was collected using a HF breakdown process guided by a user and not by the processes as described herein. Set 3 630 demonstrates computed area 632 (between the plotted data curve and the fitted line), a distribution 634 (flow rate distribution across perforations), and an outlier data set 636. In comparing set 1, set 2, and set 3, set 1 appears to have the smallest computed area with the smallest distribution. Set 1 is the likely the most effective breakdown process. Set 3 is the most ineffective breakdown process since its computed area 632 is the largest, its distribution 634 is the largest, and it contains outlier data elements. Therefore, the process can recommend that the HF model inputs corresponding to the HF data used in evaluating set 1 610 be used as the HF model inputs for the current well system.

Figure 7:
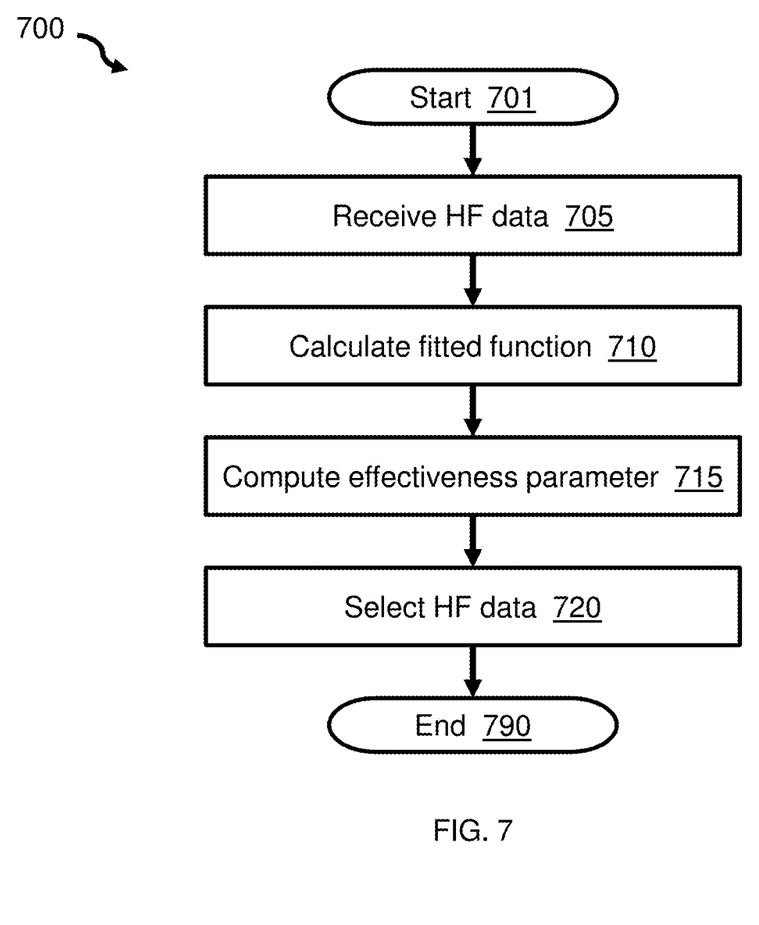
FIG. 7 is an illustration of a flow diagram of an example method to determine a best fit model input for a HF job plan.

FIG. 7 is an illustration of a flow diagram of an example method 700 to determine a best fit HF model inputs for a HF job plan. Method 700 can be utilized to analyze a set of HF data to determine the breakdown effectiveness of the HF treatment stage. Method 700 starts at a step 701 and proceeds to a step 705. In a step 705, a set of HF data can be received. The HF data can come from a data source, such as a database or other storage structure. The HF data can have been collected from the current well system or a separate well system. In some aspects, the set of HF data can be collected in real-time or near real-time from a well system and utilized in the process to determine an effectiveness parameter. This aspect can be used, for example, by a current well system where one or more previous HF treatment stages are analyzed to allow adjustments to be made on the subsequent HF treatment stages.

In a step 710 the set of HF data can be analyzed to calculate a fitted function that can produce a fitted line to the HF data. The fitted line is a minimum average data value across the HF fluid flow rate and HF pressure correspondence. In a step 715 an effectiveness parameter can be computed from the area formed by the fitted line and the top curve line of the HF data set. In some aspects, additional information can be used such as the stratigraphic well placement and perforation strategies. The effectiveness parameter indicates how effective a HF breakdown process is in meeting a specific goal. As a goal changes, the HF breakdown process can also change.

In a step 720, based on the goals of the current HF job plan, the sets of HF data can be analyzed along with their corresponding effectiveness parameter. The HF breakdown process that best fits the goal for the current well system can be selected and implemented in the HF job plan. The method ends at a step 790.

In some aspects, the step 720 can be followed by a subsequent step where the HF model inputs corresponding to the selected HF data set can be provided to a well site controller for implementation for a next HF job treatment stage. The well site controller can direct the HF fluid pressure pumps to control the HF fluid pressure, the HF fluid flow rate, and the HF composition according to the model inputs. The process of receiving a set of HF data from the current well system through to providing updated HF model inputs to the well site controller of the current well system can be utilized to implement an automated system to continuously update the HF job plan and implement the updated plan with a minimum of user input.

Figure 8:
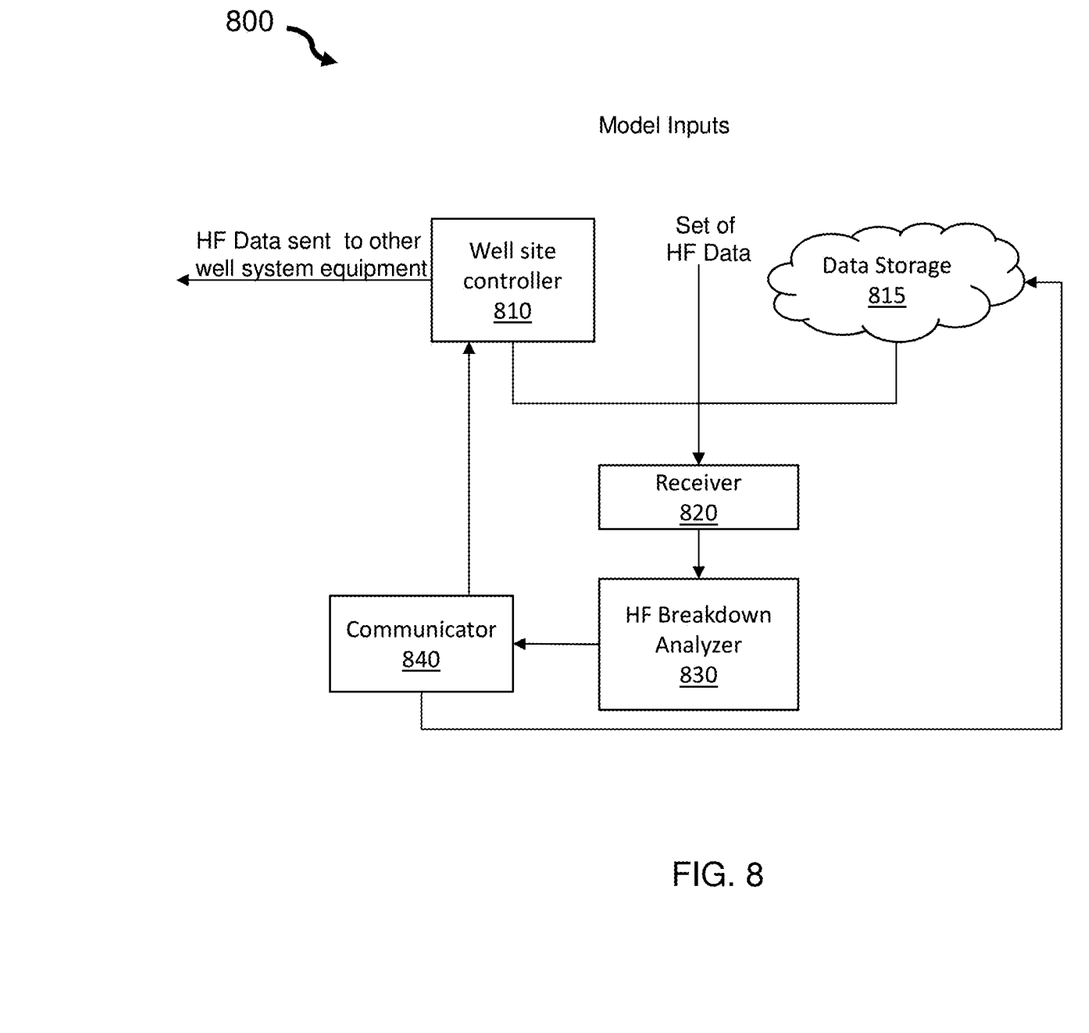
FIG. 8 is an illustration of a block diagram of an example system to determine HF model inputs to a HF job plan using sets of HF data.

FIG. 8 is an illustration of a block diagram of an example system 800 to determine HF model inputs to a HF job plan using sets of HF data. System 800 can be used to receive a set of HF data, perform the computations and calculations as described herein to determine an effectiveness parameter and to provide the corresponding HF model inputs and effectiveness parameter to other systems. System 800 includes a receiver 820 and a HF breakdown analyzer 830. System 800 can optionally include a communicator 840 and can optionally include a well site controller 810 and a data storage 815.

Data storage 815 can be of various structures, such as database or other structures, and stored in various mediums, such as a data center, server, cloud service, server, laptop, tablet, smartphone, intranet, internet, hard disk, USB storage, memory, and other storage mediums. Receiver 820 can receive one or more sets of HF data and their respective HF model inputs, such as from the well site controller 810, the data storage 815, and other data sources of HF data sets, such as from a server, data center, laptop, tablet, smartphone, or other computing systems. The HF data can be received from one or more of the HF data sources. Receiver 820 can pass the sets of HF data and HD model inputs to the HF breakdown analyzer 830.

HF breakdown analyzer 830 can is operable to calculate a fitted function to determine a fitted line for a set of the HF data. The area between the top curve of the HF data and the fitted line can be calculated. Using the area and the HF model inputs, an effectiveness parameter can be calculated. The effectiveness parameter can vary depending on the goal established by a HF job plan. Goals can be to minimize cost, minimize wear and tear on pumping equipment, minimize time, maximize production, and other well system goals. In addition, the effectiveness parameter can utilize perforation strategies and stratigraphic well placement information. The operation can be repeated if an additional set of HF data is received. The HF breakdown analyzer can select the set of HF data that best meets the goals of the HF job plan utilizing the effectiveness parameter.

The HF breakdown analyzer 830 can communicate the analyzed data, through the communicator 840. Communicator 840 can provide the HF data, HF model inputs, and the effectiveness parameter to the well site controller 810 and to the data storage 815. The well site controller 810 can utilize the received information to send instructions and commands to other well system equipment. The data storage 815 can store the HF data, HF model inputs, and the effectiveness results where this information can be used by later executions of the process. The stored data can be retrieved and used to compare against other received HF data in future analyzations.

The HF breakdown analysis system 800 represents a logical functional view of the processes. An implementation can combine or separate the functionality as appropriate. For example, the receiver 820 and the HF breakdown analyzer 830 can be combined into the same component. In addition, the HF breakdown analyzer 830 can be combined with the well site controller 810, such as when the process is being executed in near real-time at a well system. Other combinations are possible.

A portion of the above-described apparatus, systems or methods may be embodied in or performed by various digital data processors or computers, wherein the computers are programmed or store executable programs of sequences of software instructions to perform one or more of the steps of the methods. The software instructions of such programs may represent algorithms and be encoded in machine-executable form on non-transitory digital data storage media, e.g., magnetic or optical disks, random-access memory (RAM), magnetic hard disks, flash memories, and/or read-only memory (ROM), to enable various types of digital data processors or computers to perform one, multiple or all of the steps of one or more of the above-described methods, or functions, systems or apparatuses described herein.

Portions of disclosed embodiments may relate to computer storage products with a non-transitory computer-readable medium that have program code thereon for performing various computer-implemented operations that embody a part of an apparatus, device or carry out the steps of a method set forth herein. Non-transitory used herein refers to all computer-readable media except for transitory, propagating signals. Examples of non-transitory computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

In interpreting the disclosure, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

Those skilled in the art to which this application relates will appreciate that other and further additions, deletions, substitutions and modifications may be made to the described embodiments. It is also to be understood that the terminology used herein is for the purpose of describing particular embodiments only, and is not intended to be limiting, since the scope of the present disclosure will be limited only by the claims. Unless defined otherwise, all technical and scientific terms used herein have the same meaning as commonly understood by one of ordinary skill in the art to which this disclosure belongs. Although any methods and materials similar or equivalent to those described herein can also be used in the practice or testing of the present disclosure, a limited number of the exemplary methods and materials are described herein.

It is noted that as used herein and in the appended claims, the singular forms "a", "an", and "the" include plural referents unless the context clearly dictates otherwise.

Aspects disclosed herein include:
- A. A method to determine a hydraulic fracturing (HF) job plan for a current well system, including: (1) receiving HF data and corresponding HF model inputs for one or more previous well systems, wherein the previous well systems contain a similar subterranean formation as the current well system, and wherein the HF model inputs include, over a time interval, at least one of a HF fluid pressure, a HF fluid flow rate, and a HF fluid composition, (2) calculating a fitted function utilizing an analysis of a HF breakdown within each of the previous well systems utilizing the HF data, (3) computing an effectiveness parameter for each of the fitted functions and the HF model inputs, (4) selecting HF model inputs utilizing the effectiveness parameter, and (5) modifying the HF job plan utilizing the HF model inputs.
- B. A computer program product having a series of operating instructions stored on a non-transitory computer-readable medium that directs a data processing apparatus when executed thereby to determine a hydraulic fracturing (HF) job plan for a current well system, the operations including: (1) receiving HF data and corresponding HF model inputs for one or more previous well systems, wherein the previous well systems contain a similar subterranean formation as the current well system, and wherein the HF model inputs include, over a time interval, at least one of a HF fluid pressure, a HF fluid flow rate, and a HF fluid composition, (2) calculating a fitted function utilizing an analysis of a HF breakdown within each of the previous well systems utilizing the HF data, (3) computing an effectiveness parameter for each of the fitted functions and the HF model inputs, (4) selecting HF model inputs to be utilized by the HF job plan, utilizing the effectiveness parameter.

C. A system to provide hydraulic fracturing (HF) model inputs into a HF job plan, including: (1) a receiver, operable to receive one or more sets of HF data and corresponding HF model inputs for one or more previous well systems, and (2) a HF breakdown analyzer, operable to analyze each set of HF data to calculate a fitted function, to compute an effectiveness parameter utilizing the fitted function and the corresponding HF model inputs, and to select the set of HF data that has the effectiveness parameter closest to a goal of the HF job plan.

Each of aspects A, B, and C can have one or more of the following additional elements in combination: Element 1: wherein the HF data is from one or more of a data source and the current well system. Element 2: wherein the HF job plan specifies the HF fluid pressure, the HF fluid flow rate, and the HF fluid composition for the current well system. Element 3: wherein the fitted function is a linear function and the effectiveness parameter utilizes a slope of the linear function, and an area defined by the linear function and the HF data. Element 4: wherein the HF model inputs further include perforation locations and stratigraphic well placement of each well system. Element 5: wherein the method is executed after a HF job stage of the current well system, and the HF data for the previous well systems is the HF data from a previous HF job stage of the current well system. Element 6: wherein the HF job plan specifies the HF fluid pressure and the HF fluid flow rate over one or more intervals of time. Element 7: further comprising executing the HF job plan as a HF treatment stage on the current well system. Element 8: wherein the operations are executed after a HF job stage of the current well system, and the HF data for the previous well systems is the HF data from a previous HF job stage of the current well system. Element 9: further comprising modifying the HF job plan utilizing the HF model inputs. Element 10: a communicator, operable to transmit the selected set of HF data and corresponding HF model inputs. Element 11: a well site controller, operable to receive the corresponding HF model inputs and to adjust a subsequent HF job treatment stage for the current well system. Element 12: wherein the HF data from the previous well systems is a completed HF treatment stage of the current well system.

What is claimed is:

1. A method to determine a hydraulic fracturing (HF) job plan for a current well system, comprising:
receiving HF data for the current well system, and corresponding HF model inputs for one or more previous well systems, wherein the previous well systems contain a similar subterranean formation as the current well system, and wherein the corresponding HF model inputs include, over a time interval, at least one of a HF fluid pressure, a HF fluid flow rate, and a HF fluid composition;
calculating a fitted function utilizing an analysis of a HF breakdown within each of the previous well systems utilizing each element of the HF data, wherein the fitted function is a low limit of the element of the HF data;
computing an effectiveness parameter for each of the fitted functions and the corresponding HF model inputs;
selecting HF model inputs utilizing the effectiveness parameter;
modifying a HF job plan utilizing the HF model inputs; and
executing the HF job plan as a HF treatment stage on the current well system.

2. The method as recited in claim 1, wherein the HF data is from one or more of a data source and the current well system.

3. The method as recited in claim 1, wherein the HF job plan specifies a HF model input HF fluid pressure, a HF model input HF fluid flow rate, and a HF model input HF fluid composition for the current well system.

4. The method as recited in claim 1, wherein the fitted function is a linear function and the effectiveness parameter utilizes a slope of the linear function, and an area defined by the linear function and the HF data.

5. The method as recited in claim 1, wherein the HF model inputs further include perforation locations and stratigraphic well placement of each well system.

6. The method as recited in claim 1, wherein prior to the receiving, a previous HF treatment of the current well system is performed, and the HF data from the previous HF treatment of the current well system.

7. The method as recited in claim 1, wherein the HF job plan specifies a HF model input HF fluid pressure and a HF model input HF fluid flow rate over one or more intervals of time.

8. A computer program product having a series of operating instructions stored on a non-transitory computer-readable medium that directs a data processing apparatus when executed thereby to determine a hydraulic fracturing (HF) job plan for a current well system, the operations comprising:
receiving HF data, and corresponding HF model inputs for one or more previous well systems, wherein the previous well systems contain a similar subterranean formation as the current well system, and wherein the HF model inputs include, over a time interval, at least one of a HF fluid pressure, a HF fluid flow rate, and a HF fluid composition;
calculating a fitted function utilizing an analysis of a HF breakdown within each of the previous well systems utilizing each element of the HF data, wherein the fitted function is a low limit of the element of the HF data;
computing an effectiveness parameter for each of the fitted functions and the corresponding HF model inputs;
selecting HF model inputs to be utilized by a HF job plan, utilizing the effectiveness parameter;
modifying the HF job plan utilizing the HF model inputs; and
executing the HF job plan as a HF treatment stage on the current well system.

9. The computer program product as recited in claim 8, wherein the HF data is from one or more of a data source and the current well system.

10. The computer program product as recited in claim 8, wherein the HF job plan specifies a HF model input HF fluid pressure, a HF model input HF fluid flow rate, and a HF model input HF fluid composition for the current well system.

11. The computer program product as recited in claim 8, wherein the fitted function is a linear function and the effectiveness parameter utilizes a slope of the linear function, and an area defined by the linear function and the HF data.

12. The computer program product as recited in claim 8, wherein the HF model inputs further include perforation locations and stratigraphic well placement of each well system.

13. The computer program product as recited in claim 8, wherein the operations are executed after a previous HF treatment stage of the current well system, and the HF data from the previous HF treatment stage of the current well system.

14. The computer program product as recited in claim 8, wherein the HF job plan specifies a HF model input HF fluid pressure and a HF model input HF fluid flow rate over one or more intervals of time.

15. A system to provide hydraulic fracturing (HF) model inputs into a HF job plan, comprising:
   a receiver, operable to receive one or more sets of HF data, and corresponding HF model inputs for one or more previous well systems;
   a HF breakdown analyzer, operable to analyze each set of HF data to calculate a fitted function, to compute an effectiveness parameter utilizing the fitted function and the corresponding HF model inputs, and to select a HF model input that has the effectiveness parameter closest to a goal of the HF job plan, wherein the fitted function is a low limit of each respective data element of each of the sets of HF data; and
   a well site controller, operable to receive the HF model input and the corresponding HF model inputs, and to adjust a subsequent HF treatment stage of the HF job plan for a current well system.

16. The system as recited in claim 15, further comprising:
   a communicator, operable to transmit the selected HF model input and the corresponding HF model inputs.

17. The system as recited in claim 15, wherein the HF data is from a completed HF treatment stage of a current well system.

* * * * *